US012190839B2

(12) United States Patent
Lan et al.

(10) Patent No.: US 12,190,839 B2
(45) Date of Patent: Jan. 7, 2025

(54) ELECTRONIC DEVICE AND ELECTRONIC DEVICE DRIVING METHOD THEREOF

(71) Applicant: InnoLux Corporation, Miao-Li County (TW)

(72) Inventors: Yeh-Yi Lan, Miao-Li County (TW); Cheng-Cheng Pan, Miao-Li County (TW); Ming-Chin Hsu, Miao-Li County (TW); Hsiu-Chuan Chung, Miao-Li County (TW); Szu-Fan Wu, Miao-Li County (TW); Chien-Hung Chan, Miao-Li County (TW); Huang-Chi Chao, Miao-Li County (TW); Wai Lon Chan, Miao-Li County (TW); Yao-Lien Hsieh, Miao-Li County (TW); Li-Jin Wang, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 18/373,977

(22) Filed: Sep. 28, 2023

(65) Prior Publication Data

US 2024/0021170 A1 Jan. 18, 2024

Related U.S. Application Data

(63) Continuation of application No. 17/482,430, filed on Sep. 23, 2021, now abandoned.

(30) Foreign Application Priority Data

Oct. 23, 2020 (CN) ......................... 202011149845.9

(51) Int. Cl.
*G09G 3/36* (2006.01)

(52) U.S. Cl.
CPC ... *G09G 3/3614* (2013.01); *G09G 2310/0275* (2013.01); *G09G 2310/061* (2013.01);
(Continued)

(58) Field of Classification Search
CPC ......... G09G 3/3614; G09G 2310/0275; G09G 2310/061; G09G 2310/08; G09G 2320/0247; G09G 2340/0435; G09G 3/20
See application file for complete search history.

(56) References Cited

U.S. PATENT DOCUMENTS 6,307,681 B1 * 10/2001 Aoki .................... G09G 3/3688 345/94
6,903,716 B2 * 6/2005 Kawabe ............... G09G 3/3648 348/556

(Continued)

*Primary Examiner* — Michael J Jansen, II
(74) *Attorney, Agent, or Firm* — Winston Hsu

(57) ABSTRACT

An electronic device includes gate lines, maintained at a low level voltage during a blank period and sequentially scanned during an active period in a frame period, and data lines. Voltage polarities of the data lines for all the blank period are respectively identical with voltage polarities of the data lines during the active period. A first level voltage applied to one of the data lines during all the blank period is related to an average value or a maximum value of level voltages of a portion or all of the data lines during the active period. A time length of the blank period in the frame period with the average value or the maximum value applied to one of the data lines during all the blank period is longer than a first time length of a first blank period in a first frame period adjacent to the frame period.

9 Claims, 7 Drawing Sheets

(52) U.S. Cl.
CPC . *G09G 2310/08* (2013.01); *G09G 2320/0247* (2013.01); *G09G 2340/0435* (2013.01)

(56) References Cited

U.S. PATENT DOCUMENTS

| | | | | |
|---|---|---|---|---|
| 6,961,034 | B2 * | 11/2005 | Kusanagi | G09G 3/3648 345/98 |
| 7,701,426 | B2 * | 4/2010 | Yokoyama | G09G 3/3648 345/87 |
| 7,705,808 | B2 * | 4/2010 | Jeon | G09G 3/22 345/96 |
| 8,451,205 | B2 * | 5/2013 | Kitayama | G09G 3/3677 345/94 |
| 8,730,222 | B2 * | 5/2014 | Chang | G09G 3/2092 345/87 |
| 8,872,809 | B2 * | 10/2014 | Suyama | G09G 3/3655 345/212 |
| 9,142,174 | B2 * | 9/2015 | Pyun | G09G 3/3614 |
| 10,989,972 | B2 * | 4/2021 | Hirata | G02F 1/136286 |
| 11,263,989 | B2 * | 3/2022 | Shin | G09G 3/3696 |
| 2001/0009411 | A1 * | 7/2001 | Kusanagi | G09G 3/3648 345/93 |
| 2003/0169247 | A1 * | 9/2003 | Kawabe | G09G 3/342 345/204 |
| 2005/0088387 | A1 * | 4/2005 | Yokoyama | G09G 3/3648 345/87 |
| 2006/0221018 | A1 * | 10/2006 | Jeon | G09G 3/22 345/83 |
| 2010/0118013 | A1 * | 5/2010 | Kitayama | G09G 3/3677 345/98 |
| 2012/0026215 | A1 * | 2/2012 | Takeuchi | G09G 3/3614 345/691 |
| 2012/0062543 | A1 * | 3/2012 | Suyama | G09G 3/3655 345/212 |
| 2013/0113769 | A1 * | 5/2013 | Chang | G09G 3/2096 345/209 |
| 2014/0292627 | A1 * | 10/2014 | Pyun | G09G 3/3614 345/96 |
| 2019/0302558 | A1 * | 10/2019 | Hirata | G02F 1/1309 |
| 2021/0272531 | A1 * | 9/2021 | Shin | G09G 3/3677 |
| 2022/0130317 | A1 * | 4/2022 | Lan | G09G 3/3614 |
| 2024/0021170 | A1 * | 1/2024 | Lan | G09G 3/3614 |

* cited by examiner

ELECTRONIC DEVICE AND ELECTRONIC DEVICE DRIVING METHOD THEREOF

CROSS REFERENCE TO RELATED APPLICATIONS

This application is a continuation application of U.S. application Ser. No. 17/482,430, filed on Sep. 23, 2021. The content of the application is incorporated herein by reference.

BACKGROUND OF THE DISCLOSURE

1. Field of the Disclosure

The present disclosure relates to an electronic device and an electronic device driving method, and more particularly, to an electronic device and an electronic device driving method capable of mitigating flicker and ensuring high display quality.

2. Description of the Prior Art

A display device having a variable refresh rate (VRR) may reduce power consumption by temporarily reducing a refresh rate thereof. However, when lowering the refresh rate of the display device, i.e. when the refresh rate is low, leakage of the transistor within the display panel increases, such that display brightness of the display device may become dimmer or flicker. The luminance change may be even perceived by the naked eye, thereby affecting the display quality.

SUMMARY OF THE DISCLOSURE

The present disclosure provides an electronic device. The electronic device includes a plurality of gate lines and a plurality of data lines. The plurality of gate lines are sequentially scanned during an active period in a frame period, and the plurality of gate lines are maintained at a low level voltage during a blank period in the frame period. Voltage polarities of the plurality of data lines during a first time period of the blank period are respectively identical with voltage polarities of the plurality of data lines during the active period.

The present disclosure provides an electronic device driving method. The electronic device driving method includes sequentially scanning a plurality of gate lines during an active period in a frame period; and maintaining the plurality of gate lines at a low level voltage during a blank period in the frame period, wherein voltage polarities of a plurality of data lines during at least one time period of the blank period are respectively identical with voltage polarities of the plurality of data lines during the active period.

The present disclosure provides an electronic device. The electronic device includes a plurality of gate lines and a plurality of data lines. The plurality of gate lines are sequentially scanned during an active period in a frame period, and the plurality of gate lines are maintained at a low level voltage during a blank period in the frame period. Voltage polarities of the plurality of data lines for all the blank period are respectively identical with voltage polarities of the plurality of data lines during the active period, a first level voltage is applied to one of the plurality of data lines during all the blank period, a time length of the blank period in the frame period with the average value or the maximum value applied to one of the plurality of data lines during all the blank period is longer than a first time length of a first blank period in a first frame period adjacent to the frame period, and the first level voltage is related to an average value or a maximum value of level voltages of a portion or all of the plurality of data lines during the active period.

The present disclosure provides an electronic device. The electronic device includes a plurality of gate lines and a plurality of data lines. The plurality of gate lines are sequentially scanned during an active period in a frame period, and the plurality of gate lines are maintained at a low level voltage during a blank period in the frame period. A plurality of first level voltages, a plurality of second level voltages, a third level voltage, and a fourth level voltage are applied to one of the plurality of data lines during the blank period, voltage polarities of the plurality of the second level voltages are different from voltage polarities of the plurality of first level voltages, the third level voltage is equal to a common voltage, a voltage polarity of each of the plurality of first level voltages is equal to a voltage polarity of the third level voltage or a voltage polarity of the fourth level voltage.

The present disclosure provides an electronic device driving method. The electronic device driving method includes sequentially scanning a plurality of gate lines during an active period in a frame period, and maintaining the plurality of gate lines at a low level voltage during a blank period in the frame period. A first level voltage is applied to one of the plurality of data lines during all the blank period; alternatively, a plurality of second level voltages, a plurality of third level voltages, a fourth level voltage, and a fifth level voltage are applied to one of the plurality of data lines during the blank period. A time length of the blank period in the frame period with the average value or the maximum value applied to one of the plurality of data lines during all the blank period is longer than a first time length of a first blank period in a first frame period adjacent to the frame period, the first level voltage is related to an average value or a maximum value of level voltages of a portion or all of the plurality of data lines during the active period, and voltage polarities of the plurality of the third level voltages are different from voltage polarities of the plurality of second level voltages, the fourth level voltage is equal to a common voltage, a voltage polarity of each of the plurality of second level voltages is equal to a voltage polarity of the fourth level voltage or a voltage polarity of the fifth level voltage.

These and other objectives of the present disclosure will no doubt become obvious to those of ordinary skill in the art after reading the following detailed description of the embodiment that is illustrated in the various figures and drawings.

DETAILED DESCRIPTION

Figure 1:
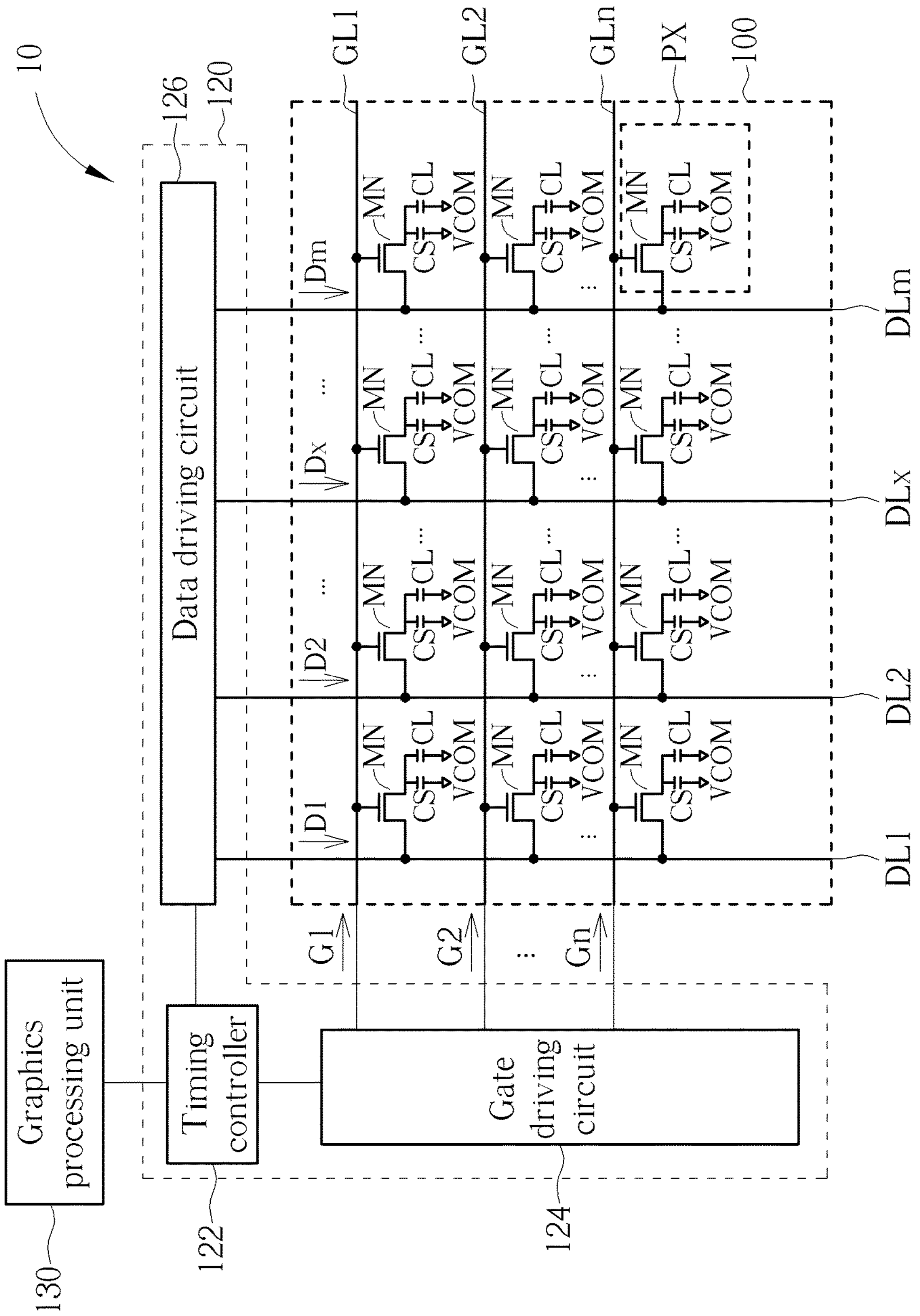
FIG. 1 is a schematic diagram of an electronic device according to some embodiments of the present disclosure.

The present disclosure has been particularly shown and described with respect to embodiments and specific features thereof. The embodiments set forth herein below are to be taken as illustrative rather than limiting. It should be readily apparent to those of ordinary skill in the art that various changes and modifications in form and detail may be made without departing from the spirit and scope of the present disclosure.

Before the further description of the embodiments, the specific terms used throughout the text will be described below.

The terms "on," "above," and "over" used herein should be interpreted in the broadest manner such that "on" not only means "directly on" something but also includes the meaning of "on" something with an intermediate feature or a layer therebetween, and that "above" or "over" not only means the meaning of "above" or "over" something but can also include the meaning it is "above" or "over" something with no intermediate feature or layer therebetween (i.e., directly on something).

Additionally, terms, such as "bottom", "below", "above", "top", and the like, may be used herein for ease of description to describe one element or feature's relationship to another element(s) or feature(s) as illustrated in the figures. If the device in the figures in turned over, elements described as "above" can become "below". It will be understood that spatially relative terms are intended to encompass different orientations of the device in use or operation in addition to the orientations depicted in the figures The term "forming" or the term "disposing" are used hereinafter to describe the behavior of applying a layer of material to the substrate. Such terms are intended to describe any possible layer forming techniques including, but not limited to, thermal growth, sputtering, evaporation, chemical vapor deposition, epitaxial growth, electroplating, and the like.

The ordinal numbers used in the description and claims, such as "first", "second", etc., are used to modify the element of claims. It does not imply and represent that the claimed element has any previous ordinal number, and it does not represent a sequence of a claimed element and another claimed element, or a sequence in the process. The use of these ordinal numbers is only used to make a clear distinction between a claimed element and another claimed element with the same name.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer and/or section from another. Thus, a first element, component, region, layer or section discussed below could be termed a second element, component, region, layer or section without departing from the teachings of the disclosure.

In addition, the phrase "in a range between a first value and a second value" or "ranged from a first value to a second value" indicates that the range includes the first value, the second value, and other values between them.

It will be understood that several embodiments shown below describe different technical features respectively. But these technical features can also be mixed or combined in various ways if they are not conflict to each other.

Certain terms are used in the specification and claims to refer to specific components. However, those skilled in the art of the present disclosure should understand that manufacturers may use different terms to refer to the same component. Moreover, this specification and claims do not use the difference in names as a way of distinguishing components, but uses the overall technical difference of the components as the criterion for distinguishing.

The "comprising" mentioned in the entire specification and claims is an open term, so it should be interpreted as "including but not limited to". When the terms "including" and/or "having" are used in this specification, they specify the existence of the features, regions, steps, operations, and/or elements, but do not exclude one or more existence or addition of other features, regions, steps, operations, elements, and/or combinations thereof.

Furthermore, the term "coupling" here includes any direct and indirect connection means. Therefore, if it is described that a first device is coupled to a second device, it means that the first device may be directly connected to the second device, or may be indirectly connected to the second device through other devices or other connection means.

In order to enable those skilled in the art to better understand the disclosure, the following specifically enumerates the embodiments of the disclosure, together with the accompanying drawings, to describe in detail the content of the disclosure and the effects to be achieved. It should be noted that the drawings are simplified schematic diagrams. Therefore, only the elements and combination relationships related to the present disclosure are shown, and some elements are omitted to provide a clearer description of the basic structure or implementation method of the present disclosure. The components and layout may be more complicated.

In addition, for the convenience of description, the components shown in the drawings of the present disclosure are not drawn to the same proportions as the actual numbers, shapes, and sizes of the components, and the detailed proportions can be adjusted according to design requirements.

Please refer to FIG. 1. FIG. 1 is a schematic diagram of an electronic device 10 according to some embodiments of the present disclosure. The electronic device 10 includes a display panel 100, a display panel driving circuit 120, and a graphics processing unit (GPU) 130. The display panel 100 includes a gate line GL1 to a gate line GLn, a data lines DL1 to a data line DLm and sub-pixels PX arranged in groups, wherein m, n are positive integers. Each intersection of the gate line GL1 to the gate line GLn and the data line DL1 to the data line DLm is respectively coupled to a transistor MN of a sub-pixel PX, and each transistor MN is coupled to a common voltage Vcom via a capacitor CS and a capacitor CL. The display panel driving circuit 120 includes a timing controller 122, a gate driving circuit 124 and a data driving circuit 126. The gate driving circuit 124 transmits a gate driving signal G1 to a gate driving signal Gn to the gate line GL1 to the gate line GLn to control the transistors MN. The data driving circuit 126 outputs a data signal D1 to a data signal Dm to the data lines DL1 to the data line DLm, to control pixel voltages of the subpixels PX.

Operations of the display panel driving circuit 120 may be summarized as a display panel driving method, which includes the following steps:

Step S200: Start.

Step S202: Sequentially scan the gate line GL1 to the gate line GLn during an active period CP1 in a frame period FP1, wherein the active period is a display time of a display image of a display panel in some embodiments.

Step S204: Maintain the gate line GL1 to the gate line GLn at a low level voltage Vg1, i.e. the transistors MN are in an off state, during a blank period BP1 in the frame period FP1, wherein voltage polarities of the data line DL1 to the data line DLm during at least one time period of the blank period BP1 are identical with voltage polarities of the data line DL1 to the data line DLm during the active period CP1. In some embodiments, the blank period is a non-display time; that is, the transistor MN is in the off state in the blank period. In a variable refresh rate display device, the blank period is not fixed; that is, blank periods of two adjacent frames have different lengths. A fixed refresh rate display device has a fixed blank period; that is, blank periods of two adjacent frames have the same length.

Step S206: End.

In short, since the voltage polarities of the data line DL1 to the data line DLm during at least one period of the blank period BP1 are identical with the voltage polarities of the data line DL1 to the data line DLm during the active period CP1, the leakage current may be reduced, thereby mitigating flicker.

Figure 2:
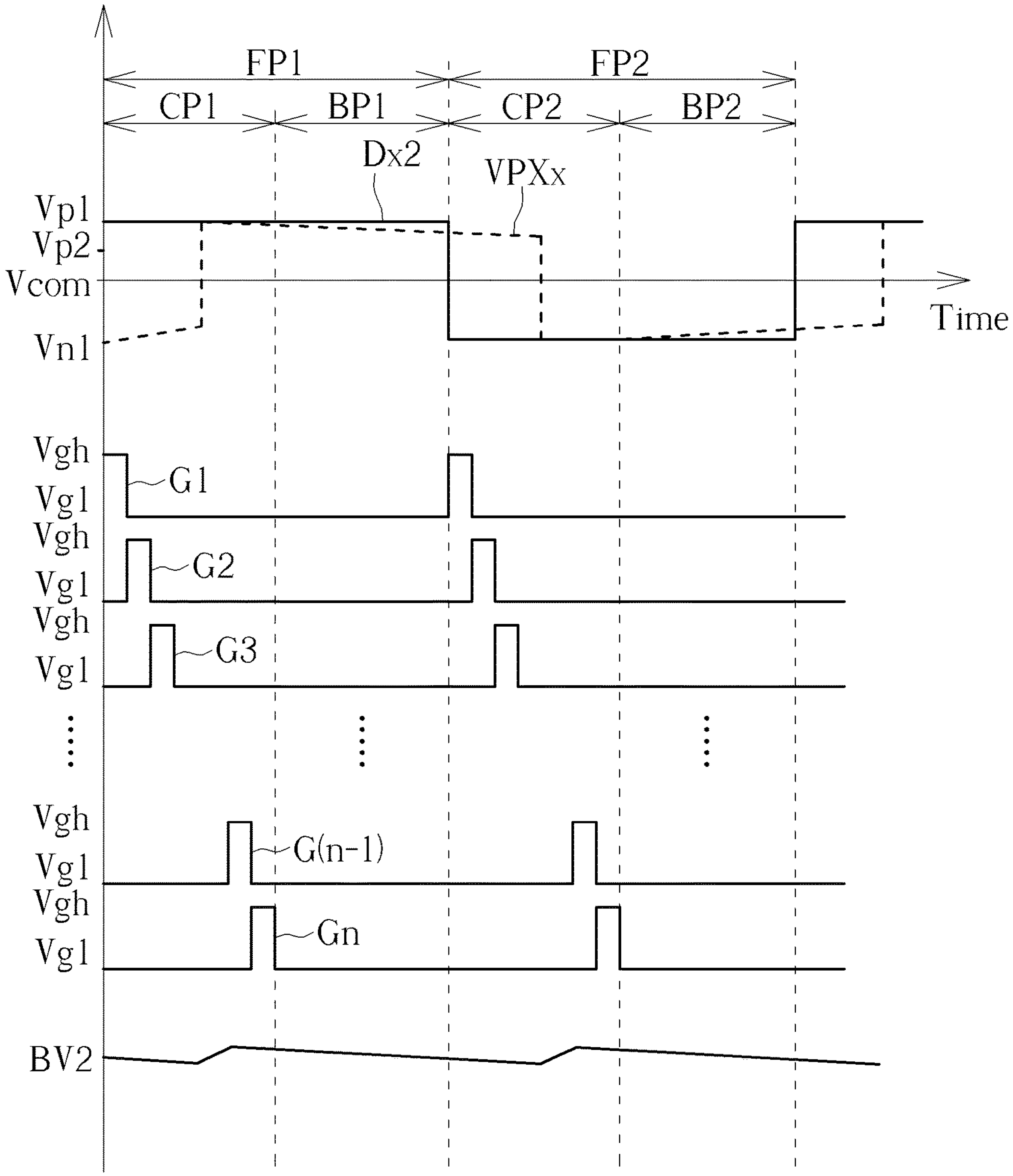
FIG. 2 is a timing diagram of gate driving signals, a pixel voltage, a data signal and a brightness according to some embodiments of the present disclosure.

For example, please refer to FIG. 2. FIG. 2 is a timing diagram of the gate driving signal G1 to the gate driving signal Gn, a pixel voltage VPXx, the data signal Dx2 (which may be used as the data signal Dx in FIG. 1) and a brightness BV2 according to some embodiments of the present disclosure. As shown in FIG. 2, the voltage polarity of the data signal Dx2 applied to the data line DLx during the blank period BP1 is identical with the voltage polarity of the data signal Dx2 during the active period CP1, so the leakage current may be reduced, thereby mitigating flicker or mitigating the dimming problem of the brightness BV2.

Specifically, the frame period FP1 may include an active period CP1 and a blank period BP1 following the active period CP1. The active period CP1 is a period during which the display panel 100 displays one frame. During the active period CP1, the gate driving circuit 124 generates the gate driving signal G1 to the gate driving signal Gn according to the instruction of the timing controller 122, to enable the transistors MN of the sub-pixels PX row by row. For example, the gate driving signal G1 and the gate driving signal G2 successively turn on the transistors MN located at the gate line GL1 and the gate line GL2, so that the data signal Dx2 may charge the sub-pixels PX located at the gate line GL1 and the gate line GL2 respectively. In the blank period BP1, all the gate driving signal G1 to the gate driving signal Gn inputted to the gate line GL1 to the gate line GLn are low level voltages Vg1, so all the transistors MN are in the off state.

That is to say, during the blank period BP1 that all the transistors MN are in the off state, the data signal Dx2 maintains the voltage polarity during the active period CP1, and does not perform polarity inversion until the next frame period FP2, thereby reducing the voltage difference between the data signal Dx2 and the pixel voltage VPXx, to mitigate influence of the data signal Dx2 on the pixel voltage VPXx. For example, the common voltage Vcom may provide a level voltage of 0 volts, the data signal Dx2 has a positive level voltage Vp1 during the active period CP1, and the data signal Dx2 has a level voltage Vp1 during the entire blank period BP1 (also called a first level voltage), and the data signal Dx2 with the negative level voltage Vn1 is not applied to the data line DLx until the frame period FP2. Therefore, the polarity inversion is not performed in the frame period FP1, and the time point of the polarity inversion may be delayed to the frame period FP2. As shown in FIG. 2, the pixel voltage VPXx also substantially has the level voltage Vp1. Since the voltage difference between the data signal Dx2 and the pixel voltage VPXx is reduced, the leakage of the transistor MN may be reduced. In some embodiments, the common voltage Vc may provide a none zero specific voltage volts, but the present disclosure is not limited thereto.

In some embodiments, a level voltage different from the level voltage Vp1 may be applied to the data line DLx during the blank period BP1. For example, the data signal Dx2 may have a positive level voltage Vp2 (may also called a first level voltage) during the blank period BP1. As shown in FIG. 2, the level voltage Vp2 is lower than the level voltage Vp1. Since the voltage polarity of the data signal Dx2 during the blank period BP1 is identical with the voltage polarity of the data signal Dx2 during the active period CP1, the leakage may be reduced. In some embodiments, the level voltage Vp2 may be higher than the level of the voltage Vp1, for example, corresponding to a full white grayscale of 255, but the present disclosure is not limited thereto. The level voltage of the data signal Dx2 during the blank period BP1 may be determined in various ways. In some embodiments, the level voltage of the data signal Dx2 during the blank period BP1 may be a preset value which is preset in the timing controller 122. The absolute value of the preset value, for example, corresponds to a gray level of 255. Alternatively, when it is known that none of the data signal D1 to the data signal Dm exceeds a level voltage limit, the absolute value of the preset value is half (for example, roughly corresponding to a gray level of 128) of the level voltage limit (for example, corresponding to a gray level of 255), but the present disclosure is not limited to this. Some embodiments of the present disclosure provide a level voltage in the blank period BP1 different from that in the active period. For example, when the level voltage during the active period is positive, a level voltage less than or equal to that in the active period may be provided in the blank period BP1. For example, if the level voltage during actuation has a gray level of 255, the level voltage with a gray level of 128 may be provided during the blank period BP1; and if the level voltage during the actuation period has a gray level of 0, the level voltage with a gray level of 0 may be provided during the blank period BP1, but the present disclosure is not limited to this. When the level voltage during the active period is negative, the blank period may be provided with a level voltage greater than or equal to that during the active period. For example, if the level voltage during the active period has a gray level of 255, the blank period BP1 may be provided with the level voltage with the gray level of 128; and if the level voltage during the active period has a gray level of 0, the blank period BP1 may be provided with a level voltage of a gray level of 0, but the present disclosure is not limited to this.

Figure 3:
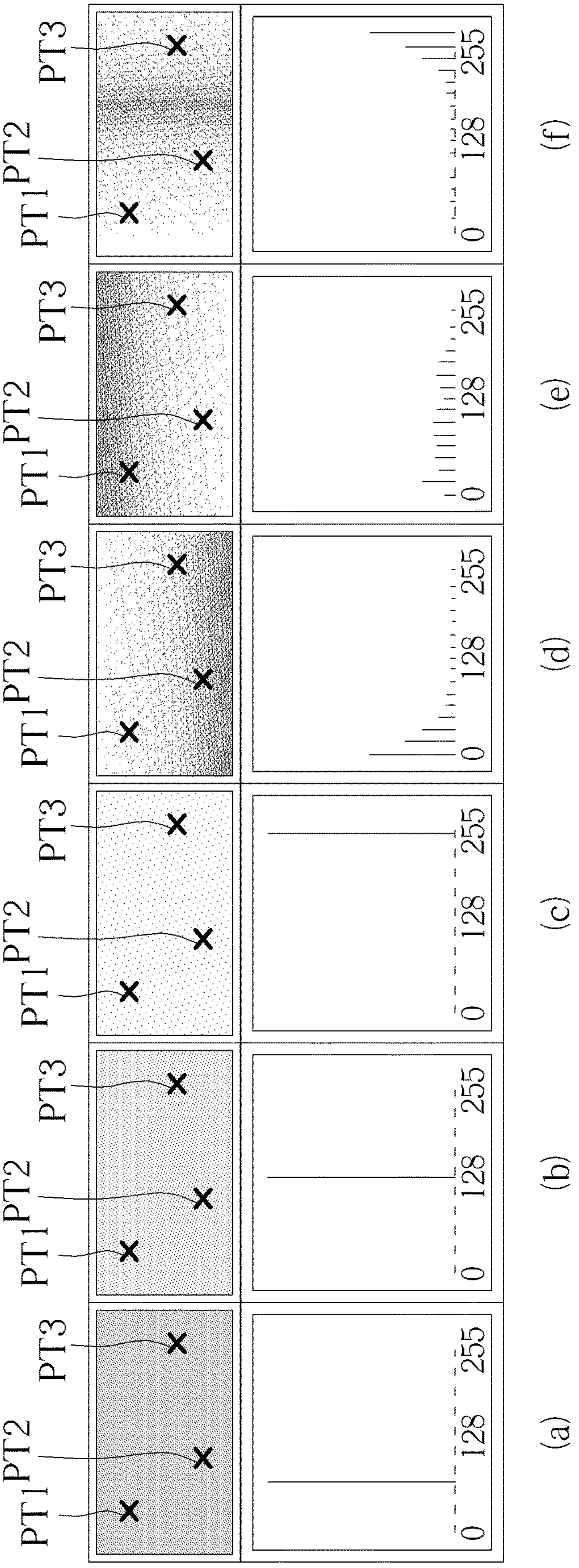
FIG. 3 is a display panel driving method according to some embodiments of the present disclosure.

In some embodiments, the level voltage of the data signal Dx2 during the blank BP1 may be determined by the timing controller 122 according to various algorithms. For example, the timing controller 122 may determine the level voltage of the data signal Dx2 in the blank period BP1 according to a plurality of specific sub-pixels PX, so as to improve the algorithm efficiency. The level voltage of the data signal Dx2 during the blank period BP1 may be related to an average value or a maximum value of level voltages of a portion of the data line DL1 to the data line DLm during the active period CP1. Alternatively, an average value or a maximum value calculated from the level voltage of the pixel voltages VPXx of a portion of the sub-pixels PX during the active period CP1 may determine the level voltage of the data signal Dx2 in the blank period BP1. Please refer to FIG. 3. FIG. 3 is a display panel driving method according to some embodiments of the present disclosure. In FIG. 3(*a*), the gray level corresponding to a feature point PT1 to a feature point PT3 in the display image is 64, so the level voltage of the data signal Dx2 in the blank period BP1 may correspond to the gray level of 64. In FIG. 3(*d*), the gray levels corresponding to feature point PT1 to feature point PT3 in the display image are 0, 64, and 128, respectively. Therefore, the level voltage of the data signal Dx2 in the blank period BP1 may correspond to an averaged gray level of 64, or the level voltage of the data signal Dx2 in the blank period BP1 may correspond to the maximum gray level of 128. The level voltage of the data signal Dx2 during the blank period BP1 may be further determined according to the lookup table of the timing controller 122, or determined based on the lookup table of the timing controller 122 and usage of interpolation, but this present disclosure is not limited to this.

Alternatively, the timing controller 122 may determine the level voltage of the data signal Dx2 during the blank period BP1 according to overall grayscale distribution, so as to improve the overall leakage current. The level voltage of the data signal Dx2 in the blank period BP1 may be related to the average value or the maximum value of level voltages of all the data line DL1 to the data line DLm during the active period CP1. Alternatively, the average value or the maximum value calculated from the level voltages of the pixel voltages VPXx of all the sub-pixels PX during the active period CP1 may determine the level voltage of the data signal Dx2 in the blank period BP1. In FIG. 3 (*b*), a histogram of the display image has a distribution concentrated in the gray level of 128, and thus the level voltage of the data signal Dx2 during the blank BP1 may correspond to a gray level of 128. In FIG. 3(*e*), according to the distribution of the histogram of the display image, it may be determined that the level voltage of the data signal Dx2 during the blank period BP1 corresponds to the gray level of 100.

From the above, the display panel driving method according to the present disclosure may mitigate the problem of change of the brightness BV2 caused by entering or exiting a variable refresh rate (VRR), or the reduced refresh rate during the panel self-refresh (PSR) period. For example, when the graphics processing unit 130 activates the variable refresh rate function, the blank period BP1 corresponding to the low frequency refresh rate is longer, but the voltage polarities of the data line DL1 to the data line DLm during the blank period BP1 are identical with the voltage polarities of the data line DL1 to the data line DLm during the active period CP1. That is, the blank period BP1 and the active period CP1 are regarded as the same frame, so the internal leakage of the transistor MN may be reduced to prevent the brightness BV2 from changing significantly. Modulation or voltage waveforms of the data line DL1 to data line DLm during the blank BP1 may be substantially determined or analyzed by measurements.

The above are only the embodiments of the present disclosure, and those skilled in the art may make various changes and modifications accordingly. The following will describe different embodiments of the present disclosure, and to simplify the description, the following description will not repeat the same parts. Furthermore, same elements of each embodiment of the present disclosure are denoted by the same symbols, to facilitate comparison between each embodiment.

Figure 4:
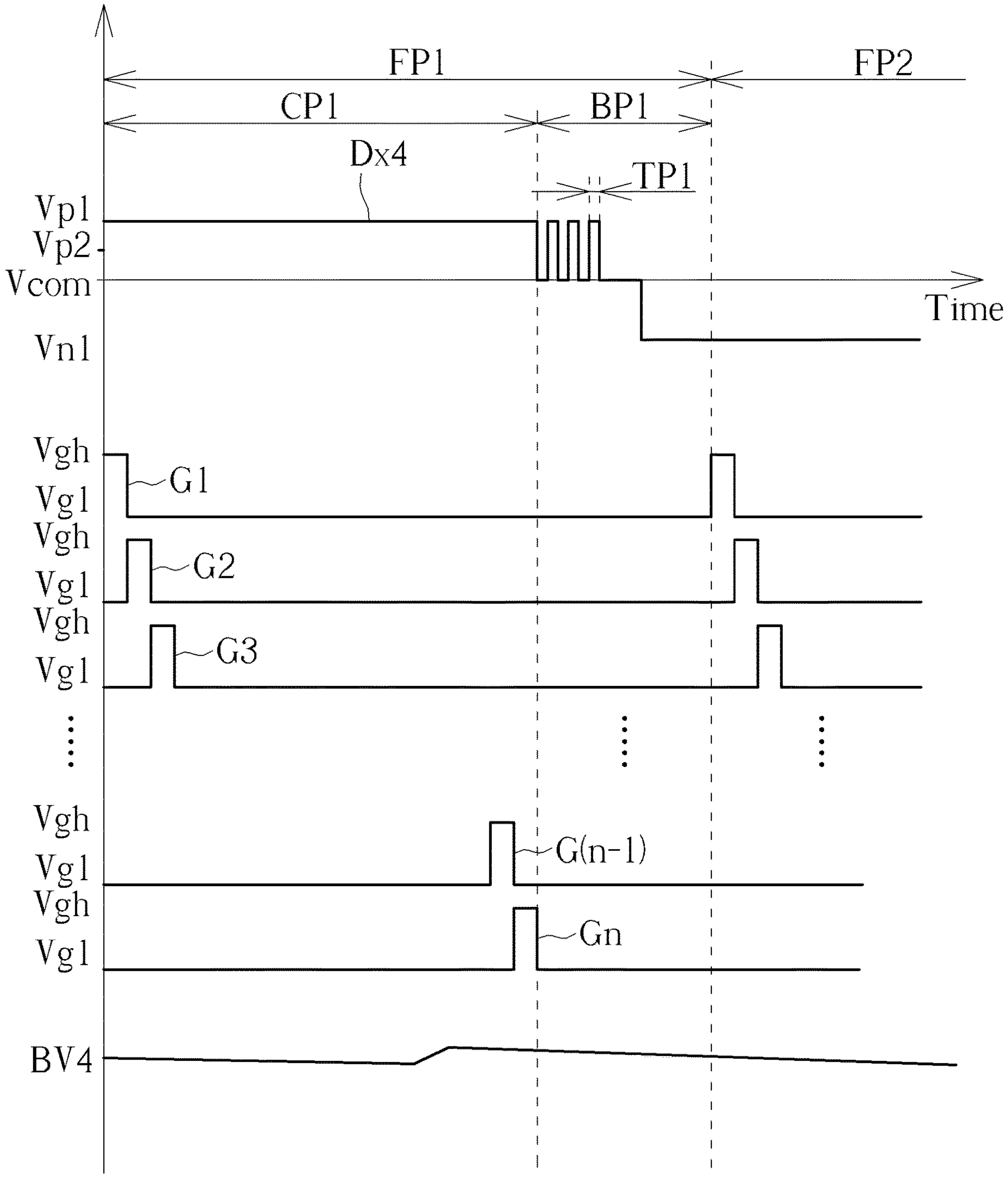
FIG. 4 to FIG. 7 are timing diagrams of gate driving signals, pixel voltages, data signals and brightness according to some embodiments of the present disclosure.

Please refer to FIG. 4. FIG. 4 is a timing diagram of the gate driving signal G1 to the gate driving signal Gn, the data signal Dx4 (which may be used as the data signal Dx in FIG. 1), and the brightness BV4 according to some embodiments of the present disclosure. As shown in FIG. 4, the voltage polarity of the data signal Dx4 applied to the data line DLx at least during a time period TP1 of the blank period BP1 is identical with the voltage polarity of the data signal Dx4 during the active period CP1, so the degree of leakage may be reduced, so as to mitigate the flicker or solve the dimming problem of the brightness BV4.

Specifically, during the blank period BP1, the provided data signal Dx4 is toggle instead of fixed. As shown in FIG. 4, the voltage polarity of the data signal Dx4 in the time period TP1 is identical with the voltage polarity of the data signal Dx4 in the active period CP1. In this way, the voltage difference between the data signal Dx4 and the pixel voltage will not be too large at least during the time period TP1, so the situation that the voltage difference between the data signal Dx4 and the pixel voltage in the blank period BP1 is too large may be alleviated, thereby delaying and mitigating leakage time of the transistor MN. For example, the data signal Dx4 has a positive level voltage Vp1 during the active period CP1. During the blank period BP1, the level voltage Vp1 different from the common voltage Vcom and a level voltage (also referred to as a third level voltage) equal to the common voltage Vcom are alternately provided to the data line DLx. That is, during the blank period BP1, the positive level voltage Vp1 (also referred to as a second level voltage) is provided to the data line DLx multiple times, thereby reducing the voltage difference between the data signal Dx4 and the pixel voltage, and thus reducing the internal leakage of the transistor MN to prevent the brightness BV4 from changing significantly.

In some embodiments, voltage waveforms of the data lines DL1 to the data line DLm during the blank BP1 are square waves, but the present disclosure is not limited thereto. The swing of the data signal Dx4 during the blank period BP1 may increase additional power consumption, and the power consumption is proportional to ACV2×F, where ACV is the peak-to-peak value or voltage amplitude of the voltage waveform, and F is the frequency of the voltage waveform. Thus, the product of the square of the voltage amplitude of the voltage waveform and the frequency must be less than a threshold. In this way, by using the display panel driving method disclosed in the present disclosure, the power consumed by the electronic device 10 may be limited.

In some embodiments, the length of the time period TP1 may be adjusted according to different design considerations. For example, the gate driving signal G2 may turn on the transistor MN located at the gate line GL2 in a time period TP2 to charge the sub-pixels PX located at the gate line GL2, and the time period TP1 may be an integer multiple of the time period TP2, thereby reducing power consumption and achieving desired optical effects, such as 2 times or 4 times, but the present disclosure is not limited to this.

Figure 5:
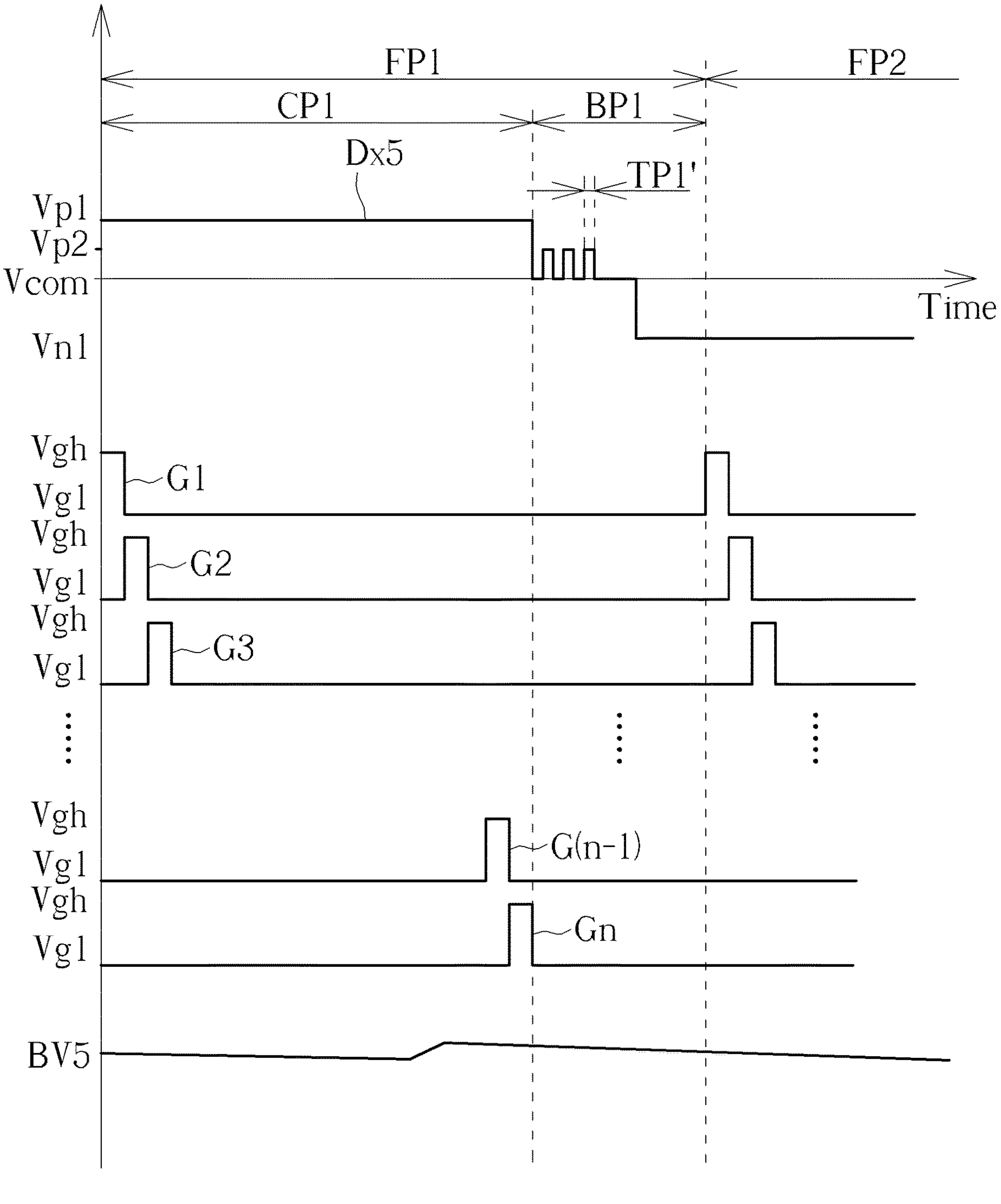

In some embodiments, a level voltage different from the level voltage Vp1 may be applied to the data line DLx during the blank period BP1. For example, please refer to FIG. 5. FIG. 5 is a timing diagram of the gate driving signal G1 to the gate driving signal Gn, the data signal Dx5 (which may be used as the data signal Dx in FIG. 1), and the brightness BV5 according to some embodiments of the present disclosure. The data signal Dx5 may have a positive level voltage Vp2 (also referred to as a second level voltage) during the blank period BP1. A level voltage Vp2 different from the common voltage Vcom and a level voltage equal to the common voltage Vcom (also referred to as a third level voltage) are alternately provided to the data line DLx. As shown in FIG. 5, the level voltage Vp2 is lower than the level voltage Vp1; in some embodiments, the level voltage Vp2 may be higher than the level voltage Vp1, for example, corresponds to a full white gray level of 255, but the present disclosure is not limited to this. The voltage polarity of the data signal Dx5 during the time period TP1' is identical with the voltage polarity of the data signal Dx5 during the active period CP1. In this way, the voltage difference between the data signal Dx5 and the pixel voltage will not be too large at least during the time period TP1', so that the situation that the voltage difference between the data signal Dx5 and the pixel voltage in the blank period BP1 is too large may be alleviated, thereby delaying and mitigating the leakage time of the transistor MN. A length of the time period TP1' for the data signal Dx5 may be identical with the time period TP1 in FIG. 4 or may be different from the time period TP1 in FIG. 4, but the present disclosure is not limited thereto. In the blank period BP1, the data signal Dx5 swings instead of being a constant value, so the degree of leakage current may be reduced.

Figure 6:
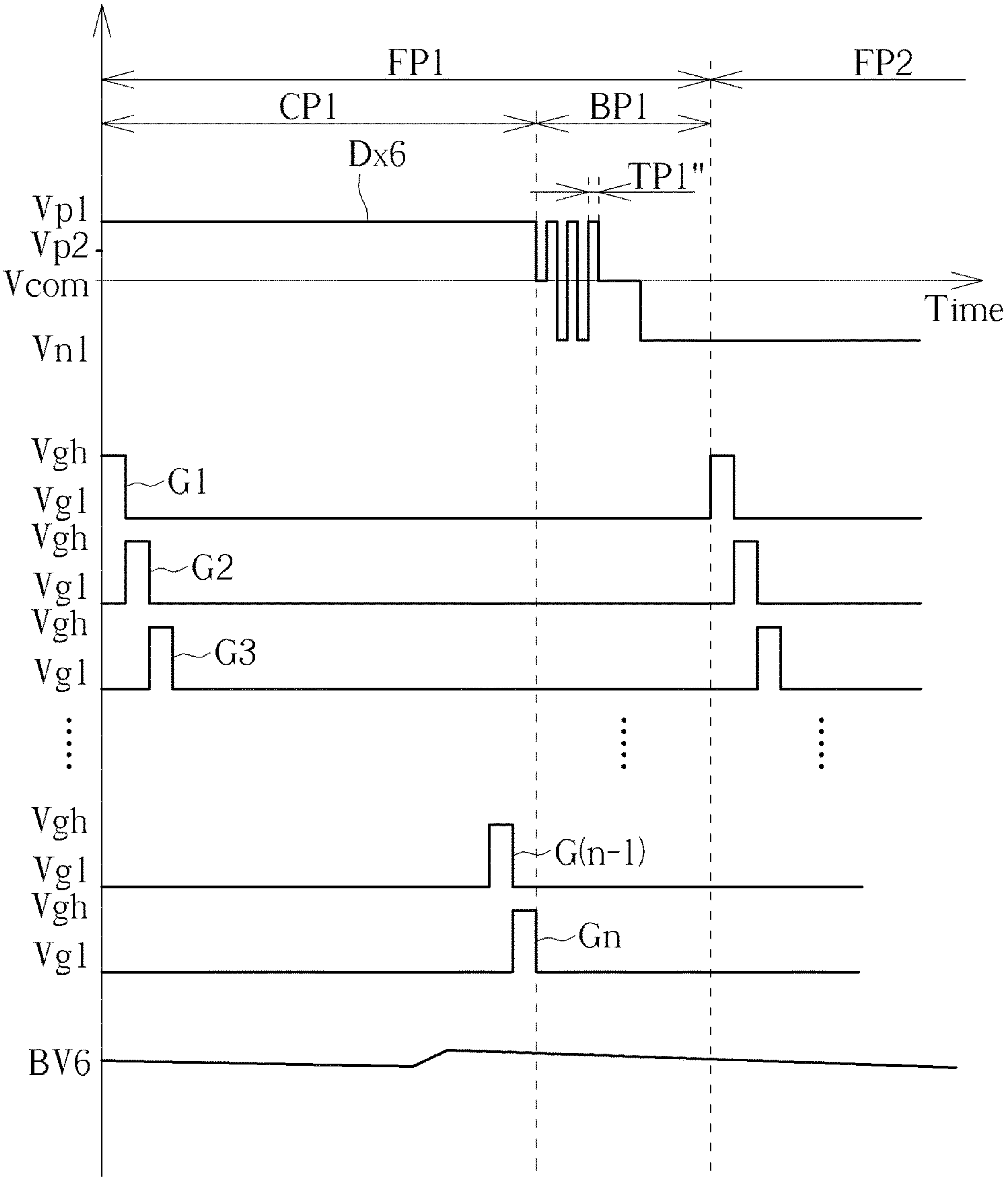

Alternatively, please refer to FIG. 6. FIG. 6 is a timing diagram of the gate driving signal G1 to the gate driving signal Gn, the data signal Dx6 (which may be used as the data signal Dx in FIG. 1), and the brightness BV6 according to some embodiments of the present disclosure. The data signal Dx6 may have a positive level voltage Vp1 (also referred to as a second level voltage) and a negative level voltage Vn1 (also referred to as a third level voltage) during the blank period BP1. The level voltage Vp2 and the level voltage Vn1 different from the common voltage Vcom are alternately provided to the data line DLx. As shown in FIG. 6, the absolute value of the level voltage Vn1 is equal to the absolute value of the level voltage Vp1; in some embodiments, the absolute value of the level voltage Vn1 is not equal to the absolute value of the level voltage Vp1, but this present disclosure is not limited to this. A length of the time period TP1" for the data signal Dx6 may be identical with the time period TP1 or TP', or different from the time period TP1 or TP', but the present disclosure is not limited to this. Since the data signal Dx6 swings instead of being a fixed value during the blank period BP1, the degree of leakage may be reduced.

Figure 7:
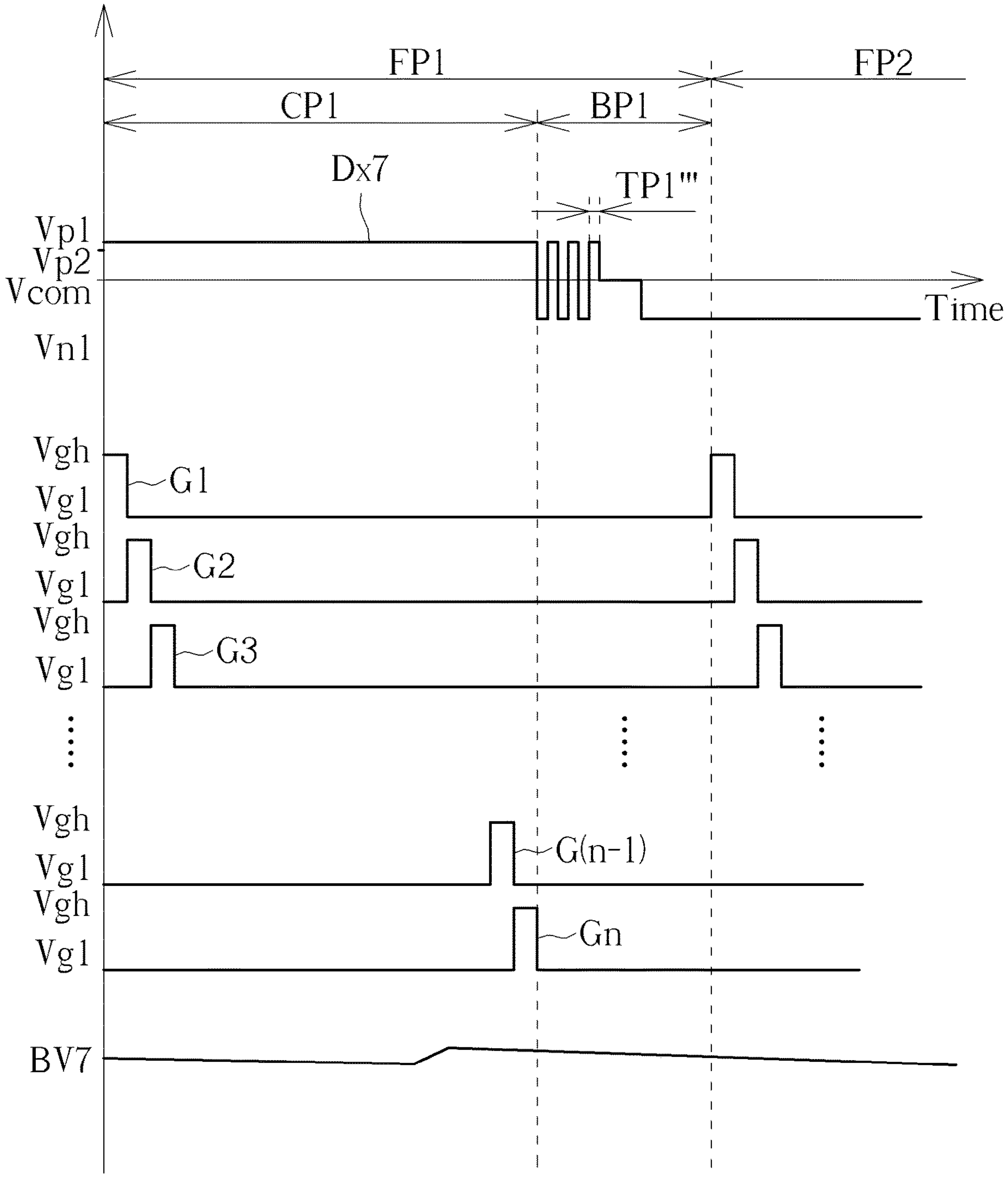

In some embodiments, the voltage waveforms of the data lines DL1 to the data line DLm during the blank BP1 may be adaptively adjusted. Please refer to FIG. 7. FIG. 7 is a timing diagram of the gate driving signal G1 to the gate driving signal Gn, the data signal Dx7 (which may be used as the data signal Dx in FIG. 1), and the brightness BV7 according to some embodiments of the present disclosure. When entering the blank period BP1, the data signal Dx7 immediately reverses its polarity, for example, changing from a positive level voltage Vp1 to a negative level voltage Vn1, but the present disclosure is not limited to this. A length of the time period TP1'" for the data signal Dx7 may be identical with the time period TP1 or TP' or TP", or different from the time period TP1 or TP' or TP", but the present disclosure is not limited to this. Since the data signal Dx7 swings in the blank period BP1 instead of being a fixed value, the degree of leakage may be reduced.

It may be seen from the above that when the pattern processor 130 activates the variable refresh rate function, the blank period BP1 corresponding to the low frequency refresh rate is longer. However, the data line DL1 to the data line DLm swing at least during the blank period BP1 instead of being a fixed value, thereby mitigating the leakage of transistor MN. Swinging situations or voltage waveforms of the data line DL1 to the data line DLm during the blank BP1 may be substantially measured and analyzed by an oscilloscope.

In some embodiments of the present disclosure, when the refresh rate is gradually increased from a minimum refresh rate to a maximum refresh rate, the brightness change of the display image may meet the specification, for example, meet (LVx−LVn)/(FRx−FRn)<0.0012 Ni nits/Hz, where LVX, Lvn, FRx and FRn are a maximum luminance value, a minimum luminance value, a maximum refresh rate and a minimum refresh rate, respectively. That is to say, the present disclosure may effectively reduce the brightness change of the image caused by the frequency change.

In some embodiments of the present disclosure, the electronic device 10 may include, for example, a thin film transistor (TFT) having a semiconductor material, and a top gate transistor, a bottom gate transistor, a double gate transistor or a dual gate thin film transistor having semiconductor material such as amorphous silicon, low temperature poly-silicon (LTPS) or metal oxide, or a combination of the above material, but is not limited to these. In some embodiments, different thin film transistors may have the above-mentioned different semiconductor materials.

In some embodiments of the present disclosure, the electronic device 10, for example, may include liquid crystal, fluorescence, phosphor, quantum dot (QD), other appropriate display medium or any combination of the above, but not limited thereto. The light-emitting diode may include, for example, organic light-emitting diode (OLED), inorganic light-emitting diode, micro light-emitting diode (micro-LED), sub-millimeter light-emitting diode (mini-LED) or a quantum dot (QD) light emitting diode (e.g. may be QLED, QDLED), or other suitable of materials, or any combination of the above, but not limited thereto. In some embodiments of the present disclosure, the size of the micro light-emitting diode may be minimized to a micrometer-level, so that the light-emitting diode may have a size of 300 micrometers (μm)×300 μm, 30 μm×30 μm, or a cross-sectional area of 10 μm×10 μm, but not limited to this.

In some embodiments of the present disclosure, the electronic device may be, for example, a display device, an antenna device, a sensing device, a touch display device, a curved electronic device or a free shape display device, or a bendable or flexible spliced electronic device, but not limited to this. The electronic device may be, for example, a liquid crystal antenna, but it is not limited to this. The display device may be used in electronic products capable of displaying images, such as notebook computers and smart phones, but is not limited to this. An electronic device of the present disclosure may be any combination of the above, but not limited thereto. The electronic device may have a drive system, control system, a light source system, shelving systems and other peripheral systems to support the display device or an antenna device. Besides, the appearance of the electronic device may be rectangular, circular, polygonal, a shape with curved edges, or other suitable shapes.

In some embodiments of the present disclosure, the gate driving circuit 124 of the electronic device 10 may be a gate driver, the data driving circuit 126 of the electronic device 10 may be a data driver. The timing controller 122 of the electronic device 10 is coupled to the gate driving circuit 124 and the data driving circuit 126, and may provide operation signals (such as a polarity signal or multiple timing signals) to the gate driving circuit 124 and the data driving circuit 126, to control the operation (such as operation timing) of the gate driving circuit 124 and the data driving circuit 126. The gate driving circuit 124 is used to generate the gate driving signal G1 to the gate driving signal Gn according to a portion of the operation signals, and transmit the gate driving signal G1 to the gate driving signal Gn to the gate line GL1 to the gate line GLn, so as to enable the gate line GL1 to the gate line GLn of the display panel 100, thereby controlling the conduction state of the transistor MN and controlling the update timing of the sub-pixels PX in each row. The data driving circuit 126 is used to send the data signal D1 to the data signal Dm to the data line DL1 to the data line DLm according to a portion of the operation signals, so as to transmit the data signal D1 to the data signal Dm to the corresponding sub-pixels PX. As such, the display panel driving circuit 120 controls the pixel voltage of each sub-pixel PX, to control the rotation angle of the liquid crystal.

In some embodiments of the present disclosure, the capacitor CL of the electronic device 10 represents the equivalent capacitance of the sub-pixel PX in the display panel 100, and the capacitor CS is a storage capacitor. In some embodiments, the capacitor CS and the capacitor CL may both be coupled to the common voltage Vcom in the electronic device 10. In some embodiments, the storage capacitor CS may not be coupled to the common voltage Vcom, but is not limited thereto.

In some embodiments of the present disclosure, the display panel driving method may adopt frame inversion, but it is not limited to this. In the frame inversion mode, the voltage polarities of the data signals in each frame period are the same, and are opposite to the voltage polarities of the data signals in the next frame period. The display panel driving method of the present disclosure may also adopt line inversion and dot inversion, but is not limited to this. Line inversion includes row inversion and column inversion. In the row inversion mode, the voltage polarities of the data signals of each row are opposite to the voltage polarities of the data signals of its adjacent row. When using column inversion, the voltage polarities of the data signals of each column are opposite to the voltage polarities of the data signals of its adjacent column. In the dot inversion mode, the voltage polarity of the data signal of each sub-pixel is opposite to the voltage polarity of the data signal of the adjacent sub-pixel.

In summary, in this present disclosure, the voltage polarity of the data signal applied to the data line during the blank period is identical with the voltage polarity of the data signal during the active period, so the leakage current may be reduced, thereby mitigating flicker or the dimming problem of brightness. Or, the data line swings at least during the blank period instead of being a fixed value. For example, the voltage polarity of the data signal applied to the data line at least during a time period of the blank period is identical with the voltage polarity of the data signal during the active period, thereby reducing the degree of leakage and mitigating flicker.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An electronic device, comprising:

a plurality of gate lines, wherein the plurality of gate lines are sequentially scanned during an active period in a frame period, and the plurality of gate lines are maintained at a low level voltage during a blank period in the frame period; and a plurality of data lines, comprising a first data line, wherein voltage polarities of the plurality of data lines for all the blank period are respectively identical with voltage polarities of the plurality of data lines during the active period, a first level voltage is applied to the first data line during all the blank period, the first level voltage is related to an average value or a maximum value of level voltages of all of the plurality of data lines during the active period, a time length of the blank period is longer than a first time length of a first blank period, and a first frame period comprising the first blank period is adjacent to the frame period.

2. The electronic device of claim 1, wherein the first level voltage is equal to a preset value.

3. The electronic device of claim 2, wherein an absolute value of the preset value is half of a level voltage limit.

4. The electronic device of claim 1, wherein a voltage waveform of any one of the plurality of data lines during the blank period is a square wave, and a product of a square of a voltage amplitude of the square wave and a frequency is less than a threshold.

5. An electronic device, comprising:

a plurality of gate lines, wherein the plurality of gate lines are sequentially scanned during an active period in a frame period, and the plurality of gate lines are maintained at a low level voltage during a blank period in the frame period; and a plurality of data lines, comprising a first data line, wherein a waveform of the first data line during the blank period exhibits a pulse train shape, a short-line shape, and a long-line shape, wherein the pulse train shape alternates between a first level voltage and a second level voltage, wherein the short-line shape maintains at a third level voltage, wherein the long-line shape maintains at a fourth level voltage, a voltage polarity of the second level voltage is different from a voltage polarity of the first level voltage, the third level voltage is equal to a common voltage, and the voltage polarity of the first level voltage is equal to a voltage polarity of the third level voltage or a voltage polarity of the fourth level voltage.

6. The electronic device of claim 5, wherein the second and first level voltages alternate with each other during a first time interval of the blank period, the third level voltage is applied during a second time interval of the blank period, the fourth level voltage is applied during a third time interval of the blank period, the first level voltage is applied during a first time slot of the first time interval, the second level voltage is applied during a second time slot of the first time interval, a time length of the first time slot or a time length of the second time slot is shorter than a time length of the second time interval or a time length of the third time interval.

7. The electronic device of claim 5, wherein the voltage polarity of the second level voltage is different from the voltage polarity of the third level voltage or the voltage polarity of the fourth level voltage.

8. The electronic device of claim 5, wherein a voltage waveform of any one of the plurality of data lines during the blank period is a square wave, and a product of a square of a voltage amplitude of the square wave and a frequency is less than a threshold.

9. An electronic device driving method, comprising:

sequentially scanning a plurality of gate lines during an active period in a frame period; and maintaining the plurality of gate lines at a low level voltage during a blank period in the frame period, wherein a plurality of data lines comprises a first data line, a first level voltage is applied to the first data line during all the blank period or a waveform of the first data line during the blank period exhibits a pulse train shape, a short-line shape, and a long-line shape, wherein the first level voltage is related to an average value or a maximum value of level voltages of all of the plurality of data lines during the active period, a time length of the blank period is longer than a first time length of a first blank period, and a first frame period comprising the first blank period is adjacent to the frame period, wherein the pulse train shape alternates between a second level voltage and a third level voltage, the short-line shape maintains at a fourth level voltage, the long-line shape maintains at a fifth level voltage, a voltage polarity of the third level voltage is different from a voltage polarity of the second level voltage, the fourth level voltage is equal to a common voltage, and the voltage polarity of the second level voltage is equal to a voltage polarity of the fourth level voltage or a voltage polarity of the fifth level voltage.

* * * * *